(12) United States Patent
Rho et al.

(10) Patent No.: US 9,291,856 B2
(45) Date of Patent: Mar. 22, 2016

(54) LIQUID CRYSTAL DISPLAY DEVICE

(71) Applicant: SAMSUNG DISPLAY CO., LTD., Yongin, Gyeonggi-Do (KR)

(72) Inventors: Soon Joon Rho, Suwon-Si (KR); Kyungmin Kim, Seoul (KR); Jin-Lak Kim, Osan-Si (KR); Joon-Hyung Park, Seoul (KR); Hyelim Jang, Yongin-Si (KR); Kyungseon Tak, Hwaseong-Si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 22 days.

(21) Appl. No.: 14/273,216

(22) Filed: May 8, 2014

(65) Prior Publication Data

US 2015/0070625 A1    Mar. 12, 2015

(30) Foreign Application Priority Data

Sep. 12, 2013   (KR) .......................... 10-2013-0109914

(51) Int. Cl.
| | | |
|---|---|---|
| *C09K 19/00* | (2006.01) | |
| *G02F 1/1337* | (2006.01) | |
| *C09K 19/30* | (2006.01) | |
| *G02F 1/137* | (2006.01) | |

(52) U.S. Cl.
CPC ...... *G02F 1/133707* (2013.01); *C09K 19/3003* (2013.01); *C09K 2019/3016* (2013.01); *G02F 2001/13712* (2013.01); *G02F 2001/133742* (2013.01)

(58) Field of Classification Search
CPC ............... C09K 19/00; C09K 19/3003; C09K 2019/3016; G02F 2001/13712; G02F 2001/133742; G02F 1/13307

USPC ........ 428/1.1; 349/56, 61, 167, 177, 178, 182
See application file for complete search history.

(56) References Cited

U.S. PATENT DOCUMENTS

| | | | |
|---|---|---|---|
| 4,069,167 A | | 1/1978 | Inukai et al. |
| 4,330,426 A | * | 5/1982 | Eidenschink et al. ... 252/299.63 |
| 2011/0315925 A1 | | 12/2011 | Hiraoka et al. |
| 2013/0062559 A1 | | 3/2013 | Hattori et al. |
| 2013/0135544 A1 | | 5/2013 | Yamamoto et al. |
| 2015/0070625 A1 | * | 3/2015 | Rho et al. ........................ 349/61 |

FOREIGN PATENT DOCUMENTS

| | | |
|---|---|---|
| JP | 2011-153202 | 8/2011 |
| KR | 10-0308156 | 7/2002 |
| KR | 10-1016282 | 2/2011 |
| KR | 10-1045443 | 6/2011 |
| KR | 10-2011-0095616 | 8/2011 |
| KR | 10-2012-0003861 | 1/2012 |

OTHER PUBLICATIONS

English Abstract Publication No. 10-2005-0069110.
English Abstract Publication No. 10-2005-0029523.
English Abstract Publication No. 10-2000-0025973.
Detlef Pauluth, et al., "Advanced Liquid Crystals for Television," J. Mater. Chem., 2004, 14, pp. 1219-1227.
http://www.redorbit.com/news/technology/1112582043/lg_electronics_unviels_new . . . Nov. 7, 2013.

* cited by examiner

*Primary Examiner* — Geraldina Visconti
(74) *Attorney, Agent, or Firm* — F. Chau & Associates, LLC

(57) ABSTRACT

A liquid crystal display panel includes a first substrate, a second substrate that faces the first substrate, and a liquid crystal layer interposed between the first substrate and the second substrate. The liquid crystal layer includes liquid crystal molecules that have negative dielectric anisotropy and a nematic-isotropic phase transition temperature (Tni) of about 110° C. or more.

9 Claims, 5 Drawing Sheets

LIQUID CRYSTAL DISPLAY DEVICE

CROSS-REFERENCE TO RELATED APPLICATIONS

This U.S. non-provisional patent application claims priority under 35 U.S.C. §119 from Korean Patent Application No. 10-2013-0109914, filed on Sep. 12, 2013, in the Korean Intellectual Property Office, and all the benefits accruing therefrom, the contents of which are herein incorporated by reference in their entirety.

BACKGROUND

Embodiments of the present disclosure are directed to a liquid crystal display device.

A liquid crystal display device generally includes a first substrate that includes a plurality of pixel electrodes, a second substrate that includes a common electrode, and a liquid crystal layer provided between the first and second substrates. A liquid crystal display device displays an image by changing the light transmittance of the liquid crystal layer according to an electric field formed between each of the pixel electrodes and the common electrode. A liquid crystal display device includes a plurality of pixels, each of which includes the pixel electrode.

Recently, a liquid crystal display device has been developed that can display a three-dimensional image as well as a two-dimensional image, which requires more image information to be provided to a user. This in turn requires driving a pixel more rapidly as compared to a pixel in a conventional display.

SUMMARY

Embodiments of the present disclosure provide a liquid crystal display device capable of being driven at a high temperature.

Embodiments of the inventive concept provide a liquid crystal display panel that includes a first substrate, a second substrate that faces the first substrate, and a liquid crystal layer interposed between the first substrate and the second substrate. The liquid crystal layer includes liquid crystal molecules that have a negative dielectric anisotropy and a nematic-isotropic phase transition temperature (Tni) at about 110° C. or more.

In some embodiments, the liquid crystal layer may exclude alkenyl-based liquid crystal molecules. The liquid crystal layer may have a rotational viscosity of about 190 mPa·s or more at about 20° C., a splay elastic modulus of about 17 or more, and a bending elastic modulus of about 19 or more.

In other embodiments, the liquid crystal layer may include at least one kind of liquid crystal molecules represented by a following chemical formula,

[Chemical Formula 1]

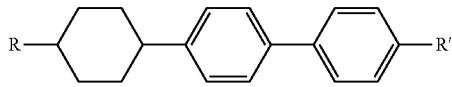

wherein, R and R' each represents an alkyl group having 1 to 7 carbon atoms, and a length to width ratio of each of the liquid crystal molecules may be about 6.6 or more.

In still other embodiments, the liquid crystal molecules may have a following structure:

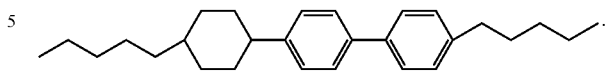

In even other embodiments, the liquid crystal display panel may include a backlight unit that provides light to the liquid crystal display panel at a luminance of about 1,500 cd/m² or more.

In yet other embodiments, the liquid crystal layer may be a vertical alignment mode liquid crystal layer that is driven at a temperature of from about 40 to about 60° C.

Further embodiments of the inventive concept provide a liquid crystal display panel that includes a first substrate, a second substrate that faces the first substrate, and a liquid crystal layer interposed between the first substrate and the second substrate. The liquid crystal layer includes liquid crystal molecules that have a negative dielectric anisotropy and include at least one kind of liquid crystal molecule represented by

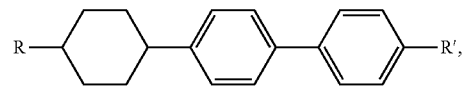

wherein R and R' each represents an alkyl group having 1 to 7 carbon atoms.

Further embodiments of the inventive concept provide a liquid crystal display panel that includes a first substrate, a second substrate that faces the first substrate, and a liquid crystal layer interposed between the first substrate and the second substrate. The liquid crystal layer comprises liquid crystal molecules that have a negative dielectric anisotropy and a rotational viscosity of about 190 mPa·s or more at about 20° C.

In the liquid crystal display device according to an embodiment of the inventive concept, a driving at a high temperature is possible, and display quality of the same level as a conventional liquid crystal display device may be accomplished.

DETAILED DESCRIPTION OF EXEMPLARY EMBODIMENTS

Figure 1:
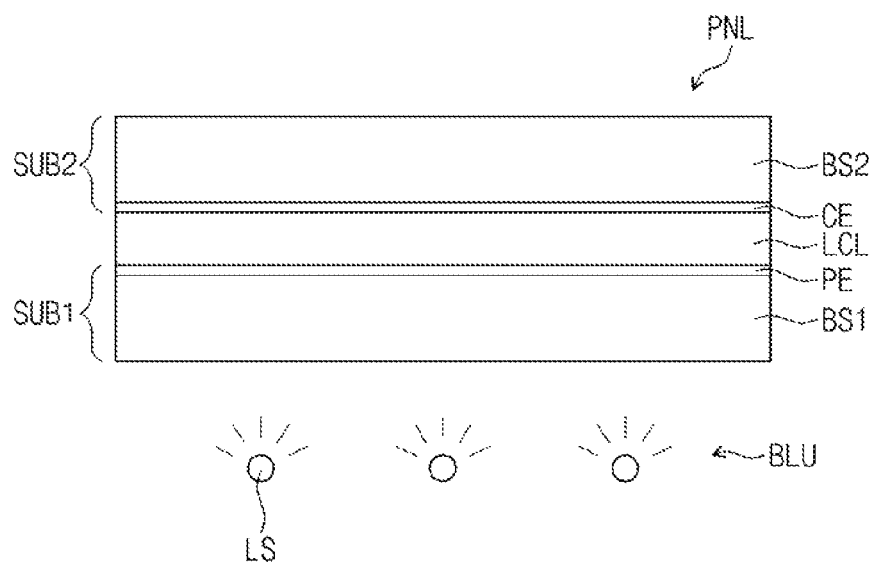
FIG. 1 is a cross-sectional view that schematically illustrates a liquid crystal display device according to an embodiment of the inventive concept.

Exemplary embodiments of the inventive concept will be described below in more detail with reference to the accompanying drawings. The inventive concept may, however, be embodied in different forms and should not be construed as limited to the embodiments set forth herein.

In the drawings, the dimensions of layers and regions may be exaggerated for clarity of illustration. In the drawings, like reference numerals may refer to like elements throughout Embodiments of the present disclosure are directed to a liquid crystal display device. In an embodiment of the inventive concept, a liquid crystal display device may be used in various places for various usages without limitation. For example, a liquid crystal display device may be used as an indoor TV, a personal digital assistance, an outdoor billboard, a navigation system installed in an automobile, etc.

FIG. 1 is a cross-sectional view that schematically illustrates a liquid crystal display device according to an embodiment of the inventive concept.

Referring to FIG. 1, a liquid crystal display device includes a liquid crystal display panel PNL and a backlight unit BLU.

The backlight unit BLU can provide light to the liquid crystal display panel PNL and is disposed under the liquid crystal display panel PNL. The backlight unit BLU includes a light source LS that emits light. In FIG. 1, a plurality of the light sources LS are disposed under the liquid crystal display panel PNL. However, embodiments of the present disclosure are not limited thereto. For example, in an embodiment of the inventive concept, a single light source LS may be provided. In another embodiment of the inventive concept, the light source LS may be provided at one side of the liquid crystal display panel PNL. Further, various light sources LS, such as a point light source, a linear light source, and a surface light source, may be used, and embodiments are not limited thereto. That is, the structure and the shape of a backlight unit BLU is not specifically limited, and may have various structures and shapes.

A liquid crystal display panel PNL displays an image. The liquid crystal display panel PNL may be provided as a tetragonal plate shape having two pairs of parallel sides. In an embodiment, the liquid crystal display panel PNL may be a rectangle having one pair of long sides and one pair of short sides. The liquid crystal display panel PNL includes a first substrate SUB1, a second substrate SUB2 facing the first substrate SUB1, and a liquid crystal layer LCL disposed between the first substrate SUB1 and the second substrate SUB2.

The first substrate SUB1 includes a first base substrate BS1 and a pixel electrode PE provided on the first base substrate BS1. The second substrate SUB2 includes a second base substrate BS2 and a common electrode CE provided on the second base substrate BS2. The pixel electrode PE and the common electrode CE provide an electric field to the liquid crystal layer LCL. In an embodiment of the inventive concept, the direction of electric field may be perpendicular to the first and second substrates SUB1 and SUB2. However, embodiments of the present disclosure are not limited thereto. In another embodiment of the inventive concept, the direction of electric field may be horizontal to the first and second substrates SUB1 and SUB2.

A liquid crystal display device in accordance with an embodiment of the inventive concept may be driven in an environment liable to be exposed to a high temperature or ultraviolet light. For example, a liquid crystal display device according to an embodiment of the inventive concept may be used as an outdoor billboard or a navigation system for an automobile. In these cases, the liquid crystal display device may be temporarily exposed to a temperature of about 85° C. or more. However, defects, such as afterimage, may be decreased or prevented in the liquid crystal display device according to an embodiment of the inventive concept. These effects will be described in detail below.

Alkenyl-based liquid crystal molecules may react chemically and transform into other species when exposed to a high temperature or ultraviolet light. For example, when a liquid crystal layer is exposed to high temperature or ultraviolet light, alkenyl-based liquid crystal molecules may transform into radicals or ions. These radicals or ions may react with impurities or other liquid crystal molecules in the liquid crystal layer and may transform the other liquid crystal molecules or generate other impurities. In these cases, defects, such as afterimage, may be generated due to the transformed liquid crystal molecules and other impurities. However, since embodiments of the inventive concept do not include alkenyl-based liquid crystal molecules, defects due to alkenyl-based liquid crystal molecules may be decreased or prevented.

In an embodiment of the inventive concept, a liquid crystal layer that includes liquid crystal molecules may have a nematic-isotropic phase transition temperature (Tni) of about 110° C. or more to have a more stable driving state even when being driven in an environment exposed to high temperatures below that of the transition temperature Tni and ultraviolet light. If a liquid crystal layer has a nematic-isotropic phase transition temperature of about 110° C. or less, the liquid crystal molecules may exhibit abnormal driving properties at high temperatures, and image quality may deteriorate. In a liquid crystal display device that includes conventional liquid crystal molecules that have a nematic-isotropic phase transition temperature of about 85° C., a blackening phenomenon may be generated when driven outdoors for a long time due to the abnormal driving of the liquid crystal molecules. However, in a liquid crystal display device that includes a liquid crystal layer having a nematic-isotropic phase transition temperature of about 110° C. or more according to an embodiment of the inventive concept, a blackening phenomenon may not occur because the nematic-isotropic phase transition temperature is higher than that of a conventional liquid crystal layer.

To attain a nematic-isotropic phase transition temperature in the above-described range, a liquid crystal layer LCL according to an embodiment of the inventive concept may include liquid crystal molecules that have a length to width ratio of about 6.3 or more. In each of the liquid crystal molecules, 'length' means the length of the liquid crystal molecule measured in an extended direction, and 'width' means the length of the liquid crystal molecule measured in a direction perpendicular to the length. The length and the width are average values of the liquid crystal molecules.

The liquid crystal layer LCL may include at least one kind of the liquid crystal molecules represented by the following Chemical Formula 1. In the following Chemical Formula 1, the number of carbon atoms in the alkyl group may be selected so that the length to width ratio may be about 6.3 or more.

[Chemical Formula 1]

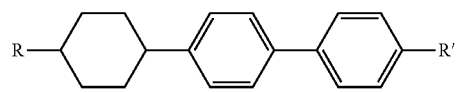

where each of R and R' independently represents an alkyl group having 1 to 7 carbon atoms.

The following Chemical Formulae 2 to 4 represent portions of conventional liquid crystal molecules. In Chemical Formulae 2 to 4, the compound of Chemical Formula 2 has a length to width ratio of about 6.0 and a nematic-isotropic phase transition temperature of about −5° C., the compound of Chemical Formula 3 has a length to width ratio of about 6.28 and a nematic-isotropic phase transition temperature of about 35° C., and the compound of Chemical Formula 4 has a length to width ratio of about 6.6 and a nematic-isotropic phase transition temperature of about 166° C. Referring to Chemical Formulae 2 to 4, the nematic-isotropic phase transition temperature generally increases with increasing length to width ratio.

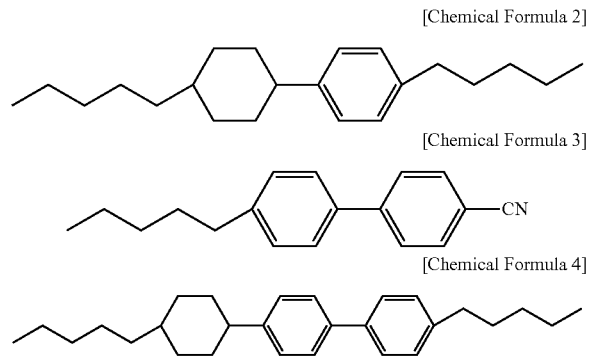

[Chemical Formula 2]

[Chemical Formula 3]

[Chemical Formula 4]

In an embodiment of the inventive concept, the nematic-isotropic phase transition temperature of the liquid crystal layer may be about 110° C. or more, and the alkyl group carbon number may be selected so that the length to width ratio may be 6.6 or more. In this case, a liquid crystal layer LCL according to an embodiment of the inventive concept may include a liquid crystal molecule of Chemical Formula 4.

In an embodiment of the inventive concept, when the nematic-isotropic phase transition temperature of the liquid crystal layer LCL is in the above-described range, that is, about 110° C. or more, the rotational viscosity of the liquid crystal molecules may increase as compared with conventional liquid crystal molecules.

For example, in a conventional liquid crystal layer that has a nematic-isotropic phase transition temperature of about 85° C., the liquid crystal molecules may have a rotational viscosity of about 135 mPa·s. However, in a liquid crystal layer having a nematic-isotropic phase transition temperature of about 110° C. according to an embodiment of the inventive concept, the liquid crystal molecules may have a rotational viscosity of about 190 mPa·s or more, for example, about 195 mPa·s.

The increase of the rotational viscosity may increase the response time. Let the time for the liquid crystal molecules to be transformed by an electric field be referred to as a rising time (Ton), and let the time for the transformed liquid crystal molecules to relax to the original state be referred to as a falling time (Toff), the falling time and the rotational viscosity satisfy the following Equation 1.

[Equation 1]

$$Toff \propto \frac{\gamma_1 d^2}{K_{33}} \quad (1)$$

where γ1 is the rotational viscosity of the liquid crystal molecules, d is the distance between the first substrate and the second substrate, that is, a cell gap, and $K_{33}$ is a bending elastic modulus.

As illustrated in Equation 1, the falling time is proportional to the rotational viscosity. Thus, when the rotational viscosity is increased, the falling time may increase, and the response time of the whole pixel may decrease.

In an embodiment of the inventive concept, the liquid crystal molecules have a bending elastic modulus of about 19 or more, which can compensate the increase of the falling time with respect to the rotational viscosity. When the bending elastic modulus increases, the falling time may decrease. The decrease of the falling time due to the bending elastic modulus may offset the increase of the falling time due to the rotational viscosity. Thus, the response time of the whole pixel may be equivalent to that of a conventional liquid crystal layer.

In an embodiment of the inventive concept, the liquid crystal molecules may have a splay elastic modulus ($K_{11}$) of about 17 or more. For example, liquid crystal molecules in a conventional liquid crystal layer that have a nematic-isotropic phase transition temperature of about 85° C., may have a splay elastic modulus of about 14.8 and a bending elastic modulus of about 15.7. On the other hand, liquid crystal molecules according to an embodiment of the inventive concept that have a nematic-isotropic phase transition temperature of about 110° C. \may have a splay elastic modulus of about 17.5 and a bending elastic modulus of about 19.2. In an embodiment of the inventive concept, the splay elastic modulus is increased as compared with a conventional liquid crystal layer, and the falling time may decrease.

As the elasticity of the liquid crystal molecules increases, the transmittance of the liquid crystal layer may decrease. However, according to an embodiment of the inventive concept, the decreased transmittance may be compensated by increasing the luminance of light emitted from the backlight unit BLU. For example, the backlight unit BLU may provide light having a luminance of about 1,500 cd/m² or more to the liquid crystal display panel PNL.

A liquid crystal display device may be driven at a temperature from about 40 to about 60° C. In a liquid crystal display device according to an embodiment of the inventive concept, the response time, particularly the falling time of each pixel may decrease as the temperature increases. However, when a liquid crystal layer is driven at a temperature exceeding about 60° C., a delay value (Δnd) of light penetrating the liquid crystal layer may decrease, and the transmittance may decrease.

Figure 2:
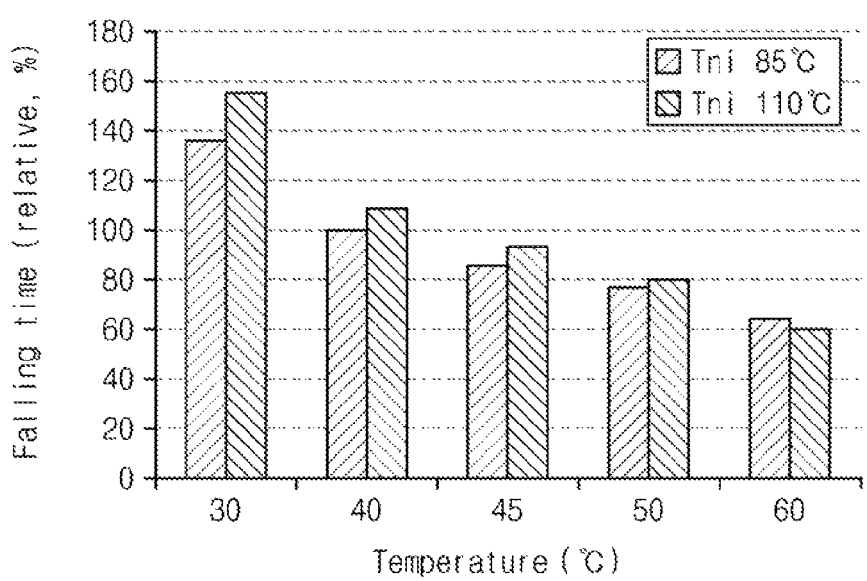
FIG. 2 is a graph that illustrates falling time with respect to driving temperature for a liquid crystal layer of Table 1.

Table 1 illustrates the falling time with respect to the driving temperature for a liquid crystal layer of a conventional liquid crystal display device and a liquid crystal layer according to an embodiment of the inventive concept. FIG. 2 is a graph that illustrates falling time with respect to driving temperature for a liquid crystal layer in Table 1. A conventional liquid crystal display device includes liquid crystal molecules that have a nematic-isotropic phase transition temperature of about 85° C., and a liquid crystal display device according to an embodiment of the inventive concept includes liquid crystal molecules that have a nematic-isotropic phase transition temperature of about 110° C. The falling times are simulation results expected from changing the driving temperature and the nematic-isotropic phase transition temperature under the same conditions.

TABLE 1

| | Toff [ms] | |
|---|---|---|
| Driving temperature | Conventional liquid crystal display device | Liquid crystal display device of an embodiment |
| 30° C. | 4.46 | 4.72 |
| 40° C. | 3.28 | 3.31 |
| 45° C. | 2.82 | 2.83 |
| 50° C. | 2.52 | 2.43 |
| 60° C. | 2.10 | 1.83 |

Referring to Table 1 and FIG. 2, when a liquid crystal layer is driven at a temperature of about 40° C. or less, the response time, in particular the falling time in each pixel may increase to about 3.5 ms or more. In particular, when a liquid crystal layer is driven at about 30° C., the falling time increased to about 4.72 for a liquid crystal layer that had a nematic-isotropic phase transition temperature of about 110° C. When considering that the appropriate falling time for a conventional liquid crystal display device is about 3 ms, an appropriate image may not be displayed when the liquid crystal layer is driven at about 40° C. or less.

Table 2 illustrates the transmittance, rising time, and falling time of a conventional liquid crystal display device and a liquid crystal display device according to an embodiment of the inventive concept that has the structure illustrated in FIG. 1. A conventional liquid crystal display device includes liquid crystal molecules that have a nematic-isotropic phase transition temperature of about 85° C., and a liquid crystal display device according to an embodiment of the inventive concept includes liquid crystal molecules that have a nematic-isotropic phase transition temperature of about 110° C.

TABLE 2

| | Conventional liquid crystal display device | Liquid crystal display device of an embodiment |
|---|---|---|
| Transmittance [%] | 4.89 | 4.78 |
| Ton [ms] | 25.91 | 24.73 |
| Toff [ms] | 4.46 | 4.72 |

As may be confirmed in Table 2, a liquid crystal display device according to an embodiment of the inventive concept uses liquid crystal molecules having a high nematic-isotropic phase transition temperature and has similar values for the transmittance, rising time and falling time as those of a conventional liquid crystal display device.

Table 3 illustrates the afterimage unrecognizable gray level and just noticeable difference (JND) of a conventional liquid crystal display device and a liquid crystal display device according to an embodiment of the inventive concept that has a structure illustrated in FIG. 1. The table shows afterimage unrecognizable gray level when the gray scale has levels from 0 to 255 from black to white.

TABLE 3

| | Afterimage unrecognizable gray level | | Afterimage just noticeable difference | |
|---|---|---|---|---|
| | Average | Standard deviation | Average | Standard deviation |
| Conventional liquid crystal display device | 119 | 119 | 3.6 | 0.3 |
| Liquid crystal display device of an embodiment | 121 | 121 | 3.4 | 0.1 |

Referring to Table 3, a liquid crystal display device according to an embodiment of the inventive concept uses liquid crystal molecules that have a high nematic-isotropic phase transition temperature and has a similar degree of the afterimage unrecognizable gray level and the afterimage just noticeable difference as those of a conventional liquid crystal display device.

In an embodiment of the inventive concept, a liquid crystal layer LCL may be driven in various modes, such as a vertical alignment mode. In this case, the liquid crystal molecules constituting the liquid crystal layer LCL may have negative dielectric anisotropy. When the liquid crystal molecules have negative dielectric anisotropy, and when an electric field is not applied, the liquid crystal molecules may be aligned in a direction substantially perpendicular with respect to the surface of the first substrate SUB1 and the second substrate SUB2. When an electric field is applied, the liquid crystal molecules may be aligned in a direction substantially horizontal with respect to the surface of the first substrate SUB1 and the second substrate SUB2.

Figure 3:
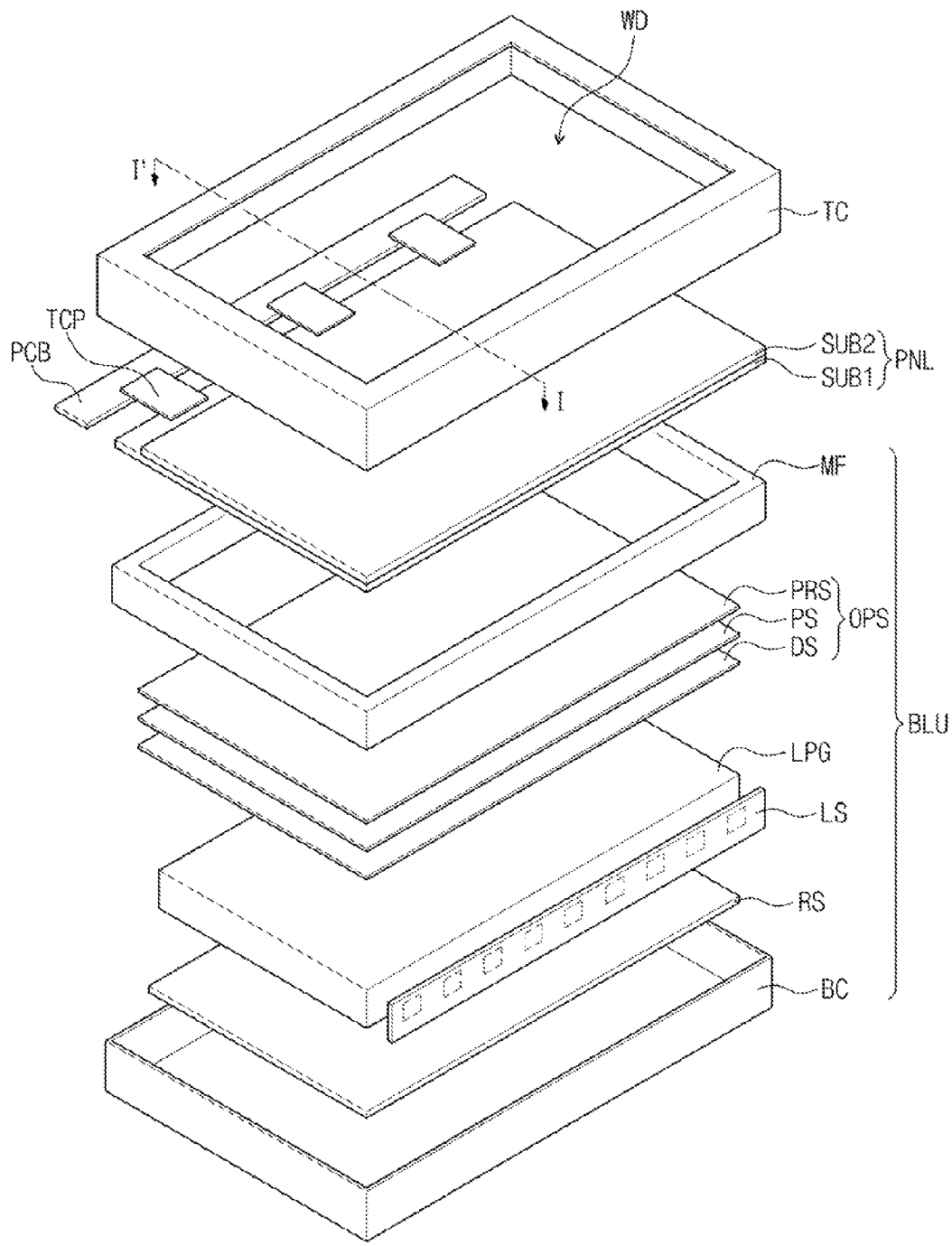
FIG. 3 is an explosive perspective view of a liquid crystal display device according to an embodiment of the inventive concept.
Figure 4:
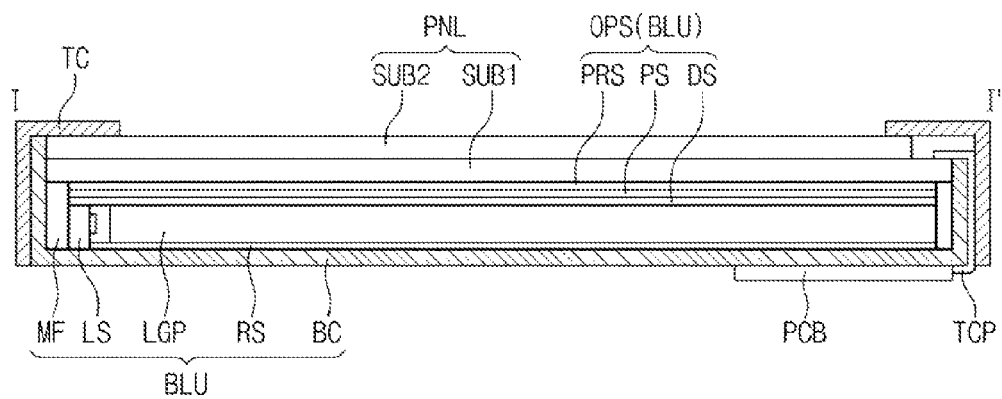
FIG. 4 is a cross-sectional view taken along a line I-I' of FIG. 1.

In an embodiment of the inventive concept, a liquid crystal display device according to an embodiment of the inventive concept may be used with a display device that uses vertically aligning liquid crystal molecules. FIG. 3 is an explosive perspective view of a liquid crystal display apparatus illustrated in FIG. 1 according to an embodiment of the inventive concept when used with a vertical alignment mode liquid crystal display device. FIG. 4 is a cross-sectional view taken along a line I-I' of FIG. 1.

Referring to FIGS. 3 and 4, a liquid crystal display device includes a liquid crystal display panel PNL, and a backlight unit BLU. For convenience of explanation, a repetitive description of those components described above will be omitted.

The liquid crystal display panel PNL displays an image. The liquid crystal display panel PNL includes a first substrate SUB1, a second substrate SUB2 facing the first substrate SUB1, and a liquid crystal layer between the first substrate SUB1 and the second substrate SUB2. The first substrate SUB1 may have a larger surface area than the second substrate SUB2, and one side of the first substrate SUB1 does not overlap the second substrate SUB2.

According to an embodiment of the inventive concept, the first substrate SUB1 may include a plurality of pixel electrodes and a plurality of thin film transistors electrically connected to the pixel electrodes in a one to one correspondence. Each of the thin film transistors switches a driving signal provided to a corresponding pixel electrode. The second substrate SUN2 may include a common electrode that forms an electric field along with the pixel electrodes that controls the alignment of liquid crystal molecules. The liquid crystal display panel PNL drives the liquid crystal layer and displays an image.

The liquid crystal display panel PNL may be provided with a tape carrier package TCP and a printed circuit board PCB electrically connected to the liquid crystal display panel PNL via the tape carrier package TCP. On the tape carrier package TCP, a driving integrated circuit (IC), etc. may be installed.

The tape carrier package TCP may be attached to one side of the first substrate SUB1 in the liquid crystal display panel PNL, in an area where the second substrate SUB2 does not overlap. For convenience of explanation, the printed circuit board PCB is illustrated in the same plane as the liquid crystal display panel PNL in FIG. 3. However, the printed circuit board PCB may be disposed at an outer surface of a bottom chassis BC as shown in FIG. 4. In this case, the tape carrier package TCP may be bent along an outer surface of the bottom chassis BC to connect the liquid crystal display panel PNL with the printed circuit board PCB.

The backlight unit BLU provides light to the liquid crystal display panel PNL.

The backlight unit BLU includes a mold frame MF that supports the liquid crystal display panel PNL, a light source LS that emits light, a light guide plate LGP that guides the light, optical sheets OPS disposed on the light guide plate LGP, a reflection sheet RS disposed under the light guide plate LGP, and a bottom chassis BC disposed under the reflection sheet RS.

The mold frame MF is provided along the edge portions of the liquid crystal display panel PNL to elevate the liquid crystal display panel PNL from the bottom chassis BC. The mold frame MF may include other elements, such as a fixing member, a stopping part for fixing or supporting the light source LS, etc. The mold frame MF may be provided at corresponding positions on four sides of the liquid crystal display panel PNL, or at least a portion of the corresponding positions of the four sides of the liquid crystal display panel PNL. For example, the mold frame MF may have a rectangular frame corresponding to the four sides of the liquid crystal display panel PNL, or may have a " ⊂ " shape corresponding to three sides of the liquid crystal display panel PNL. The mold frame MF may be formed as one body, or may be formed in plural and assembled as occasion demands. The mold frame MF may be formed of an organic material such as a polymer resin. However, the material of the mold frame MF is not limited thereto, and other materials that can have the same shape and function may be used.

The light source LS may include a spot light source, a linear light source, or a surface light source, and is not limited thereto.

The light guide plate LGP is disposed between the light source LS and the liquid crystal display pane PNL and guides the light from the light source LS to the liquid crystal display panel PNL.

The optical sheets OPS are provided between the light guide plate LGP and the liquid crystal display panel PNL. The optical sheets OPS control the light emitted from the light source. The optical sheets OPS may include a diffusion sheet DS, a prism sheet PS, and a passivation sheet PRS that are sequentially stacked on the light guide plate LGP.

The reflection sheet RS reflects light not emitted toward the liquid crystal display panel PNL, but rather leaked out, to change the path of the light toward the liquid crystal display panel PNL.

On the liquid crystal display panel PNL, a top chassis TC may be disposed. The top chassis TC supports the front edge portion of the liquid crystal display panel PNL and covers the side surface of the bottom chassis BC or the side surface of the mold frame MF. In the top chassis TC, a window WD is formed to expose a displaying part of an image.

The bottom chassis BC is disposed under the reflection sheet RS to receive the liquid crystal display panel PNL, the mold frame MF, the light source LS, the light guide plate LGP, the optical sheets OPS, and the reflection sheet RS.

Figure 5:
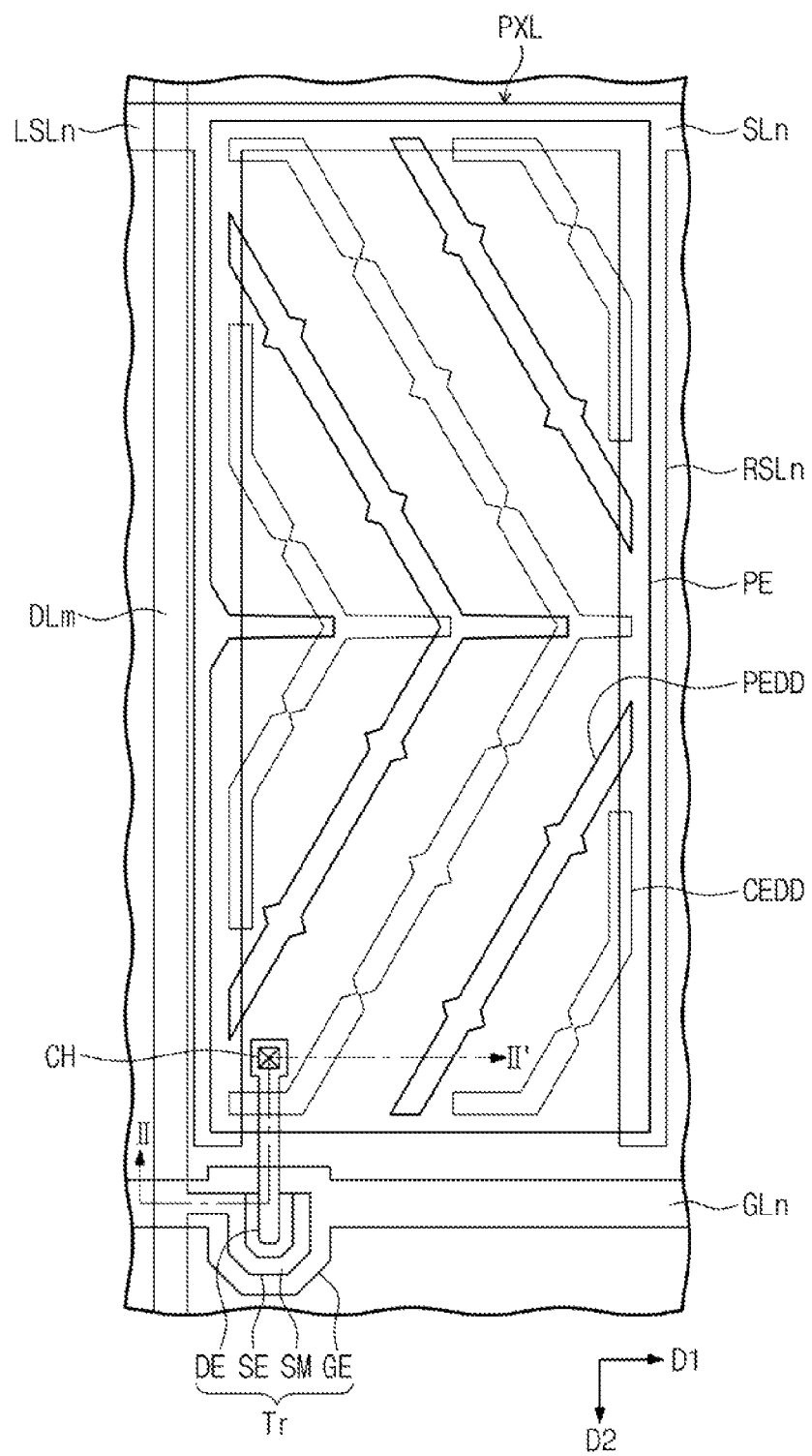
FIG. 5 is a plan view of a liquid crystal display panel according to an embodiment of the inventive concept.
Figure 6:
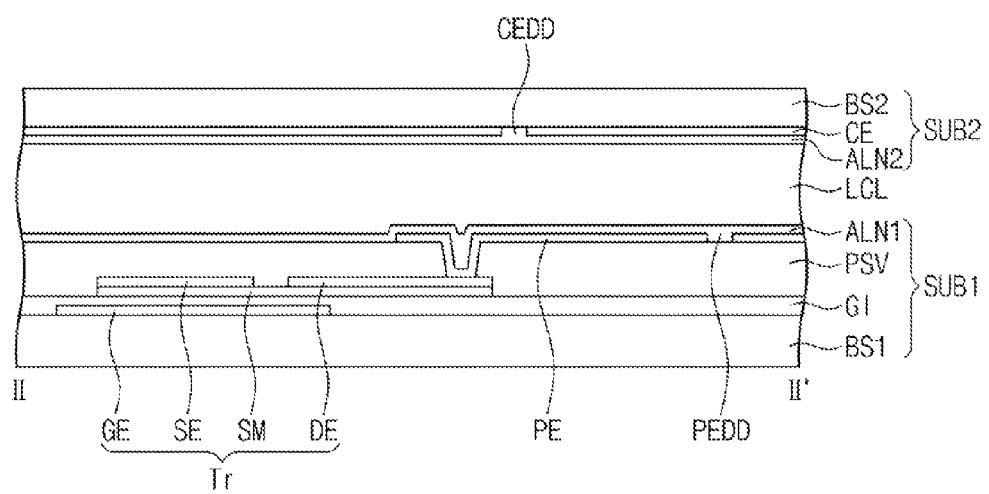
FIG. 6 is a cross-sectional view taken along a line II-II' of FIG. 5.

FIG. 5 is a plan view of a liquid crystal display panel PNL according to an embodiment of the inventive concept, and FIG. 6 is a cross-sectional view taken along a line II-II' of FIG. 5.

Referring to FIGS. 5 and 6, a liquid crystal display device includes a first substrate SUB1, a second substrate SUB2 facing the first substrate SUB1, and a liquid crystal layer LCL disposed between the first substrate SUB1 and the second substrate SUB2.

The first substrate includes a first base substrate BS1, a plurality of gate lines GLn, a plurality of data lines DLm, a plurality of pixels PXL, and a first alignment layer ALN1.

The first substrate SUB1 includes a plurality of pixel areas arranged as a matrix, and each of the plurality of pixels correspond to a respective pixel area. For convenience of explanation, one pixel area including an n-th gate line GLn of the plurality of gate lines, and an m-th data line DLm of the plurality of data lines, is illustrated in FIGS. 5 and 6. However, the remaining pixels may have similar structure in a liquid crystal display device according to an embodiment of the inventive concept. Hereinafter, the n-th gate line GLn and the m-th data line DLm will be respectively referred to as the gate line and the data line.

The gate line GLn is disposed on the first base substrate BS1 and extends in a first direction D1. The data line DLm extends in a second direction D2 crossing the first direction D1. A gate insulating layer GI is disposed between the data line DLm and the gate line GLn. The gate insulating layer GI is disposed on the entire surface of the first base substrate BS1 and covers the gate line GLn.

Each of the pixels PXL is connected to a corresponding gate line GLn and to a corresponding data line DLm.

Each of the pixels PXL includes a thin film transistor Tr, a pixel electrode PE connected to the thin film transistor Tr, and a storage electrode part.

The thin film transistor Tr includes a gate electrode GE, a semiconductor pattern SM, a source electrode SE, and a drain electrode DE.

The gate electrode GE extends from the gate line GLn or is disposed on a portion of the gate line GLn.

The gate electrode GE may be formed of a metal. The metal may include nickel, chromium, molybdenum, aluminum, titanium, copper, tungsten, and an alloy thereof. The gate electrode GE may be formed as a single layer or as a multi-layer using the metal(s). For example, the gate electrode GE may be a triple layer of stacked molybdenum, aluminum, and molybdenum, or a double layer of stacked titanium and copper. Alternatively, the gate electrode GE may be a single layer formed of a titanium and copper alloy.

On the gate electrode GE, a gate insulting layer GI is disposed.

The semiconductor pattern SM may be provided on the gate insulating layer GI. The semiconductor layer SM is provided on the gate electrode GE with the gate insulating layer GI formed therebetween. A portion of the semiconductor pattern SM overlaps the gate electrode GE. The semiconductor pattern SM may include an active pattern on the gate insulating layer GI, and an ohmic contact layer on the active pattern. The active pattern may be formed of amorphous silicon, and the ohmic contact layer may be formed as a thin film of n+ amorphous silicon. The ohmic contact layer may make an ohmic contact between the active pattern and the source electrode SE and the drain electrode DE, respectively.

The source electrode SE branches from the data line DLm. The source electrode SE is disposed on the ohmic contact layer, and a portion of the source electrode SE overlaps the gate electrode GE.

The drain electrode DE is spaced apart from the source electrode SE with the semiconductor pattern SM disposed therebetween. The drain electrode DE is disposed on the ohmic contact layer, and a portion of the drain electrode DE overlaps the gate electrode GE.

The source electrode SE and the drain electrode DE may be formed of nickel, chromium, molybdenum, aluminum, titanium, copper, tungsten, and an alloy thereof. The source electrode SE and the drain electrode DE may be formed as a single layer or a multi-layer using the metal(s). For example, the source electrode SE and the drain electrode DE may be a double layer of stacked titanium and copper. Alternatively, the source electrode SE and the drain electrode DE may be a single layer formed of a titanium and copper alloy.

Thus, the upper surface of the active pattern between the source electrode SE and the drain electrode DE may be exposed and may become a conductive channel between the source electrode SE and the drain electrode DE due to the application of the voltage of the gate electrode GE. The source electrode SE and the drain electrode DE overlap with a portion of the semiconductor layer SM, excluding the channel part formed between the spaced apart source and drain electrodes SE and DE.

The storage electrode part further includes a storage line SLn that extends in the first direction D1, and first and second branch electrodes LSLn and RSLn that branch from the storage line SLn and extend in the second direction D2.

The pixel electrode PE is connected to the drain electrode DE with a passivation layer PSV formed therebetween. The pixel electrode PE partially overlaps the storage line SLn and the first and second branch electrodes LSLn and RSLn to form a storage capacitor.

The passivation layer PSV covers the source electrode SE, the drain electrode DE, the channel part, and the gate insulating layer GI, and includes a contact hole CH1 that exposes a portion of the drain electrode DE. The passivation layer PSV may include, for example, silicon nitride or silicon oxide.

The pixel electrode PE is connected to the drain electrode DE through the contact hole CH1 formed in the passivation layer PSV.

The pixel electrode PE may include one or more first domain dividers PEDD that divide the pixel PXL into a plurality of domains. The first domain divider PEDD may be an incision or a projection formed by patterning the pixel electrode. The incision may be an aperture or a slit formed by partially removing the pixel electrode PE. The first domain divider PEDD may extend in a slanted oblique direction with respect to the first direction D1 or the second direction D2 to divide the pixel PXL in a length direction and may have a width substantially perpendicular to the extended direction.

The pixel electrode PE may be formed of a transparent conductive material. In particular, the pixel electrode PE may be formed of a transparent conductive oxide. The transparent conductive oxide may include indium tin oxide (ITO), indium zinc oxide (IZO), indium tin zinc oxide (ITZO), etc.

The first alignment layer ALN1 is disposed on the pixel electrode PE and aligns the liquid crystal molecules of the liquid crystal layer LCL, which will be explained herein below.

The second substrate SUB2 includes a second base substrate BS2, a common electrode CE, and a second alignment layer ALN2.

The common electrode CE is disposed on the second base substrate BS2, forms an electric field with the pixel electrode PE, and drives the liquid crystal layer LCL. The common electrode CE may be formed of a transparent conductive material. The common electrode CE may be formed of a conductive metal oxide such as ITO, IZO, ITZO, etc.

The common electrode CE includes one or more second domain dividers CEDD that divide the pixel PXL into a plurality of domains. The second domain divider CEDD may be an incision or a projection formed by patterning the common electrode CE. The incision may be an aperture formed by partially removing the common electrode CE. The second domain divider CEDD may extend in a slanted oblique direction with respect to the first direction D1 or the second direction D2 to divide the pixel PXL in a length direction and may have a width substantially perpendicular to the extended direction.

The first domain dividers PEDD and the second domain dividers CEDD may extend in a slanted oblique direction parallel to each other. In addition, the first domain dividers PEDD and the second domain dividers CEDD may alternate with each other when viewed in a plan view.

The second alignment layer ALN2 is disposed on the common electrode CE and aligns the liquid crystal molecules of the liquid crystal layer.

Between the first substrate SUB1 and the second substrate SUB2, a liquid crystal layer LCL that includes liquid crystal molecules is interposed.

In a liquid crystal display device, the thin film transistor Tr turns-on when a gate signal is applied to the gate line GLn. The data signal applied to the data line DLm can be transmitted to the pixel electrode PE via the thin film transistor Tr. When the thin film transistor is turned-on, and the data signal is transmitted to the pixel electrode PE, an electric field is formed between the pixel electrode PE and the common electrode CE due to the voltage difference between the voltages of the common electrode CE and the pixel electrode PE. The liquid crystal molecules are driven by the electric field. Thus, by changing the dosage of the light that penetrates the liquid crystal layer, an image may be displayed.

The above-disclosed subject matter is to be considered illustrative and not restrictive, and the appended claims are intended to cover all such modifications, enhancements, and other embodiments, which fall within the true spirit and scope of the inventive concept.

For example, a vertical alignment mode liquid crystal display device that has a plurality of domain dividers is disclosed as an exemplary embodiment of a liquid crystal display device of the inventive concept. However, the present invention is not limited thereto. A vertical alignment mode liquid crystal display device may include an electrode having slits formed in an area thereof, or an electrode having a plurality of parallel micro slits adjacent to each other.

Thus, to the maximum extent allowed by law, the scope of the inventive concept is to be determined by the broadest permissible interpretation of the following claims and their equivalents, and shall not be restricted or limited by the foregoing detailed description.

What is claimed is:
1. A liquid crystal display device, comprising:
a liquid crystal display panel, wherein the liquid crystal display panel comprises:
a first substrate;
a second substrate that faces the first substrate; and
a liquid crystal layer interposed between the first substrate and the second substrate,
wherein the liquid crystal layer comprises liquid crystal molecules that have a negative dielectric anisotropy and a nematic-isotropic phase transition temperature (Tni) of 110° C. or more,
wherein the liquid crystal layer includes a liquid crystal molecule represented by a following chemical formula:

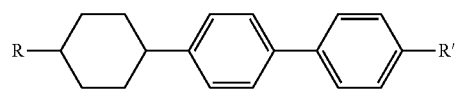

wherein R and R' each represents an alkyl group having 1 to 7 carbon atoms, wherein the liquid crystal layer excludes alkenyl-based liquid crystal molecules.

2. The liquid crystal display device of claim 1, further comprising a backlight unit configured to provide light to the liquid crystal display panel, wherein the backlight unit is configured to provide a luminance of 1,500 cd/m² or more.

3. The liquid crystal display device of claim 1, wherein a length to width ratio of each of the liquid crystal molecules is 6.6 or more.

4. The liquid crystal display device of claim 3, wherein the liquid crystal molecules have a following structure:

5. The liquid crystal display device of claim 1, wherein the liquid crystal layer has a rotational viscosity of 190 mPa·s or more at 20° C.

6. The liquid crystal display device of claim 5, wherein the liquid crystal layer has a splay elastic modulus of 17 or more, and a bending elastic modulus of 19 or more.

7. The liquid crystal display device of claim 1, wherein the liquid crystal layer is a vertical alignment mode liquid crystal layer that is configured to be driven at a temperature of from 40 to 60° C.

8. The liquid crystal display device of claim 1, wherein the first substrate includes a first electrode, the second substrate includes a second electrode configured to form an electric field together with the first electrode, wherein the first electrode includes a plurality of first domain dividers configured to divide the first electrode into a plurality of domains, and the second electrode includes a plurality of second domain dividers configured to divide the second electrode into a plurality of domains.

9. The liquid crystal display device of claim 8, wherein the first domain dividers and the second domain dividers alternate with each other when viewed from a plan view.

* * * * *